(12) United States Patent
Ojima et al.

(10) Patent No.: US 7,053,304 B2
(45) Date of Patent: May 30, 2006

(54) DOOR HARNESS INSTALLATION DEVICE

(75) Inventors: Hidenobu Ojima, Yokkaichi (JP);
Yukio Yamamoto, Yokkaichi (JP);
Kouji Takase, Yokkaichi (JP)

(73) Assignee: Sumitomo Wiring System, Ltd., Yokkaichi (JP)

( * ) Notice: Subject to any disclaimer, the term of this patent is extended or adjusted under 35 U.S.C. 154(b) by 0 days.

(21) Appl. No.: 11/012,268

(22) Filed: Dec. 16, 2004

(65) Prior Publication Data
US 2005/0148212 A1 Jul. 7, 2005

(30) Foreign Application Priority Data
Dec. 17, 2003 (JP) .............................. 2003-419113
Dec. 17, 2003 (JP) .............................. 2003-419473

(51) Int. Cl.
*B60R 16/00* (2006.01)
(52) U.S. Cl. ..................................... 174/72 A; 174/135
(58) Field of Classification Search .............. 174/72 A, 174/70 R, 135, 136, DIG. 8
See application file for complete search history.

(56) References Cited

U.S. PATENT DOCUMENTS

| 5,556,059 | A  | 9/1996 | Maeda et al. |
| 5,884,961 | A  | 3/1999 | Serizawa et al. |
| 5,957,702 | A  | 9/1999 | Nagai et al. |
| 6,051,790 | A  | 4/2000 | Takeuchi et al. |
| 6,092,859 | A  | 7/2000 | Serizawa et al. |
| 6,217,375 | B1 | 4/2001 | Nagai et al. |
| 6,354,651 | B1 | 3/2002 | Mori |
| 6,417,451 | B1 * | 7/2002 | Uchiyama ................. 174/72 A |
| 6,479,748 | B1 | 11/2002 | Mori |
| 6,536,835 | B1 | 3/2003 | Murakami et al. |
| 2002/0113460 | A1 * | 8/2002 | Murakami et al. .......... 296/152 |
| 2002/0129962 | A1 | 9/2002 | Doshita et al. |

FOREIGN PATENT DOCUMENTS

| EP | 0855312 | 7/1998 |
| EP | 1236599 | 9/2002 |
| EP | 1241056 | 9/2002 |
| JP | 10-181479 | 7/1998 |
| JP | 11-20573 | 1/1999 |

OTHER PUBLICATIONS

U.S. Appl. No. 11/014,112 to Takase et al.

* cited by examiner

Primary Examiner—Jinhee Lee
(74) Attorney, Agent, or Firm—Greenblum & Bernstein, P.L.C.

(57) ABSTRACT

A door harness mounting device in a door inner panel of a vehicle, the door inner panel including an internal face facing the compartment of the vehicle, a mounting panel mountable on the internal face, an edge face facing the body panel of the vehicle and a weather strip extending on the edge face. The device includes a grommet including a bellows portion and an elastic device which at least includes an elastic portion and a panel-fixing portion, such that the door harness can fit into the grommet and be installed closer to the internal face than a weather strip. The panel-fixing portion is adapted to engage with the mounting panel, such that the elastic device can be mounted on the mounting panel, and the mounting panel is adapted to engage with the internal face, such that the elastic portion can expand or contract as a function of whether the door is opened or closed.

9 Claims, 11 Drawing Sheets (B)

DOOR HARNESS INSTALLATION DEVICE

BACKGROUND OF THE INVENTION

1. Field of the Invention

The present invention relates to a structure or system to wire a door harness in a vehicle and, more particularly, to a structure or system in which the door harness is wired from the door inner panel to the body panel. The door harness is thus not drawn out toward the vehicle body through a hole provided in the edge face of the door panel adjacent to the vehicle body panel.

2. Description of Background Information

Typically, a door harness used in a vehicle had to be drawn out from inside the door inner panel toward the body panel through a hole provided in the edge face of the door inner panel adjacent the body panel, and then connected to a wire harness in the body panel. However, when the door harness is drawn out from inside the door inner panel, it is not possible to control the wiring operations visually. Also, a strong force is required during this wiring operation. Hence, harness-passing operations are considered difficult tasks.

Accordingly, there has been proposed a door harness system using so-called "pass-work-less" grommet or duct, by virtue of which harness-passing operations became unnecessary.

For instance, patent document JP-A-HEI-11-20573 discloses a door-harness wiring system using a "pass-work-less" grommet or duct 1, as shown in FIGS. 1A and 1B. This particular "pass-work-less" grommet or duct 1 includes a cylindrical bellows portion 2 through which the wire harness W is passed by pulling out from the door inner panel D. The grommet 1 further includes a flat fitting plate 3 bent into an L shape. The fitting plate 3 covers the corner section formed at the edge face of the door inner panel D, and the wire harness W is made to run along the internal face of the fitting plate 3. The wire harness wired in this manner is then covered by a protection plate 4 fitted from inside the door inner panel D.

Such a construction makes it unnecessary to pull out the wire harness W from the hole formed in the door inner panel D. Instead, the wire harness W is wired along the internal face of the door inner panel D toward its edge face, via its corner section, and led out toward the body panel B. The wire harness W can thus be wired by changing the level upward or downward at the fulcrum in the hinge arrangement between the door and the vehicle body. Hence, upon opening or closing the door, the wire harness W is merely twisted, but neither stretched nor compressed.

However, a weather strip 5, shown in FIG. 1B, must be mounted in a way to cross on the surface of the grommet 1 and door inner panel D. In order to achieve a high degree of water-sealing, it is necessary to flatten the grommet 1 and the wire harness W passing therethrough. This, in turn, makes it necessary to reduce the difference in level between the fitting plate 3 of the grommet 1 and the door inner panel D so as to prevent the gap from being formed. However, to use the flat grommet 1, the fitting plate 3 and the protector sheet 4 should be composed of a specific resin-made product, and the wire harness W and the grommet 1 must be provided with a special water-sealing structure. Such newly-designed products will increase the number of component parts and harness-mounting steps and, consequently, costs.

To counter this problem, there has been proposed a structure in which the weather strip 5 is mounted in a manner to avoid passing over the area of the grommet 1, e.g., by having the door harness installed closer to the passenger compartment relative to the weather strip. However, the wiring route of the door harness then becomes biased from the hinge arrangement between the door and the vehicle body, toward the passenger compartment, and the door harness has to be twisted, as well as stretched or compressed.

Taking account of these drawbacks, JP-A-HEI 10-181479 of the present applicant proposes a structure shown in FIGS. 2A and 2B, in which a guide frame 6 having a triangular shape is mounted on either the door or the vehicle body. The wire harness is contained in this guide frame 6, with the excess length looped and wired toward the counterpart door or body. In this manner, the wire harness W can be pulled out from the guide frame 6 and stretched or compressed.

The guide frame 6 has an insertion opening 6a and an exit opening 6b. After the wire harness W is passed through the guide frame 6, the part of the harness placed adjacent the insertion opening 6a is fixed thereto with tape 9. The wire harness W follows a turn in the guide frame 6 so as to form a folded portion 7, and pulled out from the exit opening 6b. The inner side of the folded portion 7 is flanked by a spring plate 8 having, e.g., a V-shaped cross-section, so that, when the door is closed, the wire harness W is drawn back into the guide frame 6 by the return force of the spring plate 8.

However, the above structure still has a drawback in that it requires a special component part, i.e., a guide frame 6 or the like.

A recent increase in the number of component parts and electrical cables mounted in new-model cars has made the door harness increasingly thicker, and such a door harness is hardly apt to be turned or bent in a small guide frame 6. Moreover, in such a state, the door harness receives too much load.

SUMMARY OF THE INVENTION

To solve the above problems, the present invention provides a structure for mounting a door harness, in which the door harness is placed closer to the vehicle's compartment relative to the weather strip. Such structure allows the number of component parts to be reduced and the load to the door harness to be lowered.

An aspect of the present invention includes a door harness mounting device to mount a door harness within a door inner panel of a vehicle, the door inner panel including an internal face facing the compartment of the vehicle, a mounting panel mountable on the internal face, an edge face facing a body panel of the vehicle and a weather strip extending on the edge face, the door harness mounting device including a grommet having a bellows portion and an elastic member, the elastic member including an elastic portion and a panel fixing portion, the grommet configured such that the door harness may be fitted into the grommet and mounted closer to the internal face than the weather strip; the panel fixing portion configured to engage the mounting panel, whereby the elastic member may be mounted on the mounting panel; and the mounting panel configured to engage the internal face, whereby the elastic portion may expand or contract with opening and closing of the door. In a further aspect of the present invention, the elastic portion includes a pair of expandable and compressible guide members facing each other and having a semicircular arch shape; and a grommet fixing portion contiguous with the bellows portion; wherein the door harness is configured to separate into a pair of bundles, each of the pair of separated bundles held by a respective one of the pair of expandable and compressible guide members; the grommet fixing portion configured to fix to the bellows portion such that the separated bundles can be assembled into the door harness and passed through the grommet; whereby the elastic member can stretch together with the door harness when the door is opened, and can be restored together with the door harness when the door is closed. Further, each of the pair of expandable and compressible guide members include two end portions, respectively, and the two end portions are linked by a flexible linking member substantially in the form of an X, such that when the door is closed the guide members are restored; and the grommet fixing portions are fixed onto a portion of the bellows portion by a tie band, and the grommet has an end portion provided with a hooking portion configured to engage with an opening portion formed in the body panel.

In a further aspect of the present invention, the elastic portion includes a looped section having a bellows side end and a spring member, the looped section longer than the spring member, the looped section being formed by binding the bellows side end and the panel fixing portion with the spring member; whereby the spring portion stretches together with the door harness when the door is opened, and contracts and is restored to its original state together with the door harness when the door is closed. Further, the internal face and the edge face form a corner portion, the corner portion including a grooved portion positioned closer to the compartment than the weather strip, whereby the door harness can extend on the internal face of the door inner panel and through the grooved portion, and be pulled out toward a body panel; and the internal face of the door inner panel includes a recessed portion, the recessed portion configured to engage the mounting panel. Additionally, the grommet is formed integrally and in once piece of rubber or an elastomer; and the bellows portion is cylindrical. Further, the body panel includes an opening, the bellows portion includes a connector terminal proximal to the body panel and including a projection configured to engage the opening.

A further aspect of the present invention includes a door harness wiring system for a vehicle including a door harness in a door inner panel, the door inner panel including an internal face facing the compartment of the vehicle, a mounting panel mountable on the internal face, an edge face facing a body panel of the vehicle and a weather strip extending on the edge face, the door harness wiring system including a grommet having a bellows portion and an elastic member including an elastic portion and a panel fixing portion; wherein the door harness is fitted into the grommet and positioned closer to the internal face than the weather strip, the panel fixing portion engaging the mounting panel whereby the elastic member is mounted on the mounting panel, the mounting panel engages the internal face, and the elastic portion expands or contracts with opening or closing of the door. Further, the elastic portion includes a pair of expandable and compressible guide members facing each other and having a semicircular arch shape and a grommet fixing portion contiguous with the bellows portion; wherein the door harness is configured to separate into a pair of bundles, each bundle held by one of the pair of expandable and compressible guide members, respectively, the grommet fixing portion configured to fix to the bellows portion such that the separated bundles can be assembled into the door harness and passed through the grommet; whereby the elastic member can stretch together with the door harness when the door is opened, and can be restored together with the door harness when the door is closed. Further, each pair of expandable and compressible guide members have two end portions, and the respective two end portions are linked by a flexible linking member substantially in the form of an X, such that when the door is closed the guide members are restored. Further, the elastic portion includes a looped section having a bellows side end and a spring member, the looped section longer than the spring member, the looped section formed by binding the bellows side end and the panel fixing portion with the spring member; whereby the spring portion stretches together with the door harness when the door is opened, and the spring portion contracts and is restored to its original state together with the door harness when the door is closed.

In a further aspect of the present invention, the internal face and the edge face form a corner portion, the corner portion includes a grooved portion and the grooved portion is positioned closer to the compartment than the weather strip, whereby the door harness can extend on the internal face of the door inner panel and through the grooved portion, and pulled out toward a body panel; and the internal face of the door inner panel includes a recessed portion, configured to engage the mounting panel. Further, the internal face and the edge face form a corner portion, the corner portion includes a grooved portion and the grooved portion is positioned closer to the compartment than the weather strip, whereby the door harness can extend on the internal face of the door inner panel and through the grooved portion, and be pulled out toward a body panel. Additionally, the internal face of the door inner panel includes a recessed portion configured to engage the mounting panel. To this end, there is provided a structure for mounting a door harness within a door inner panel of a vehicle, the door inner panel comprising an internal face facing the compartment of the vehicle, a mounting panel mountable on the internal face, an edge face facing a body panel of the vehicle and a weather strip extending on the edge face.

As mentioned above, by stretching or compressing or expanding/compressing the door harness, the latter can be passed in the area located closer to the vehicle's compartment, i.e., farther from the fulcrum or pivot line of the hinge arrangement, with respect to the weather strip. Accordingly, it becomes unnecessary to take the countermeasures hitherto called for in the prior art, such as flattening the grommet or duct and door harness, providing special component parts for this purpose, installing a special water-sealing structure, etc. Furthermore, the structure of the invention provides a device to completely protect the wire harness and the compartment from water infiltration.

According to a first embodiment of the invention, the door harness is separated into two parts, both parts being fixed to the respective expandable and compressible guide members, which are disposed face to face, e.g., in the height direction of the door. As a result, the stretching and compressing movement is rendered easier than when the door harness is grouped in one bundle. Further, the loads imparted to each door harness by the above movements are lowered, and breakage of the wire harness can be prevented.

Further, the door harness can follow smoothly the opening or closing movements of the door, and the pair of expandable and compressible guide members are prevented from going away and taking up precious space. In other words, the expandable/compressible guide members can be implemented in a compact space.

Further yet, when the expandable and compressible guide members are fixed to the grommet by a fixing device, e.g., a tie band, they are securely prevented from deviating from the grommet during the stretching or compressing operation.

Furthermore, the door harness separated into two parts can be stretched or compressed together with the corresponding spring portions of the expandable and compressible guide members. By virtue of such configuration, even though the door harness is wired in the area located closer to the vehicle's compartment than is the weather strip, i.e., farther from the fulcrum line of the hinge arrangement, the door harness can smoothly follow the door's opening or closing movement. Likewise, the grommet and the harness require no special water-sealing structure. There is also no need to prepare a flattened grommet and door harness, or particular component parts for that purpose. Hence, the water sealability is further enhanced.

According to a second embodiment of the invention, when the grommet or duct hitherto used to connect the door harness to the hinge arrangement between the door and the car body is replaced by the elastic portion comprising a looped section and a spring member, the door harness can be stretched or shrunk depending on the opening or closing of the door. In this manner, the door harness can be passed closer to the compartment of the vehicle than is the weather strip, i.e., farther from the fulcrum point of the hinge arrangement. As a result, it is no longer necessary to flatten the grommet and door harness, or to prepare component parts specially for that purpose, or to provide a special water-sealing device. Accordingly, while mounting the door harness in the proximity of the hinge arrangement, the number of component parts and mounting steps can be reduced, and costs can be lowered.

Further, the spring member is integrally formed with the grommet used in the door-harness mounting zone of the hinge arrangement, and the excess length portion of wire harness previously looped can be stretched or compressed in response to the stretching or compressing movement of the spring member. By virtue of such configuration, even though the door harness is wired in the area located closer to the vehicle's compartment than is the weather strip, i.e., farther from the fulcrum line of the hinge portion, the door harness can smoothly follow the opening or closing movement of the door. Likewise, as in the first embodiment, the grommet and the wire harness require no special water-sealing structure. There is also no need to prepare a flattened grommet and door harness or particular parts for that purpose. Hence, the water sealability is further enhanced. Further, the number of component parts and assembly steps can be reduced, as well as the costs.

BRIEF DESCRIPTION OF THE DRAWINGS

The above and the other objects, features and advantages of the present invention will be made apparent from the following description of the preferred embodiments, given as non-limiting examples, with references to the accompanying drawings, in which.

DETAILED DESCRIPTION OF THE INVENTION

Figure 1A:
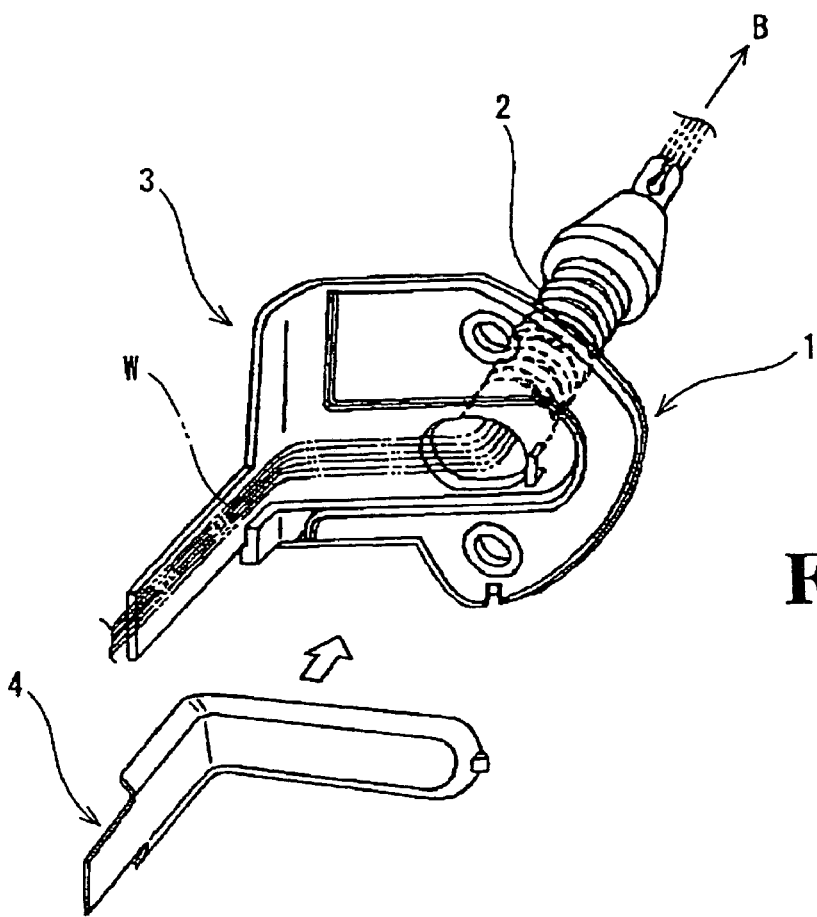
FIG. 1A is an example of a prior art structure for mounting a door harness.
Figure 1B:
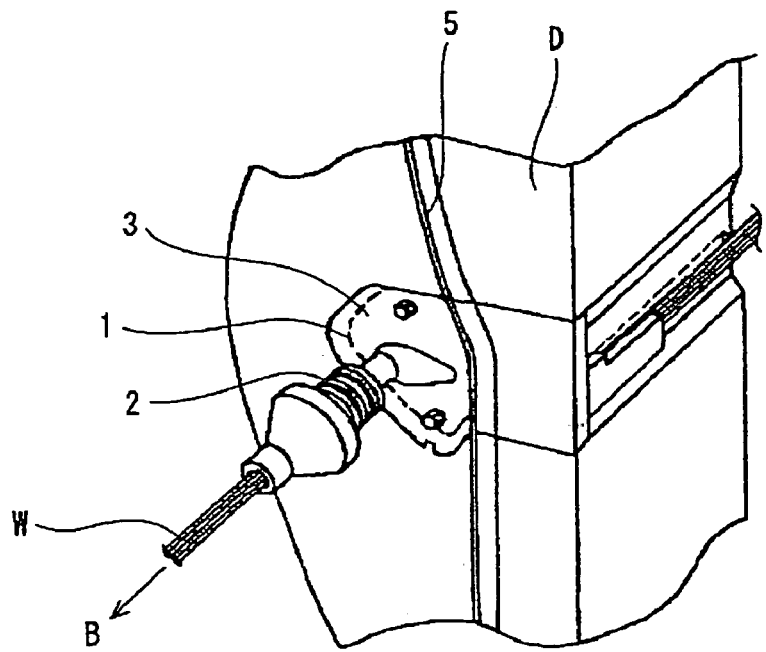
FIG. 1B is a second view of the prior art structure for mounting a door harness according to FIG. 1A.
Figure 2A:
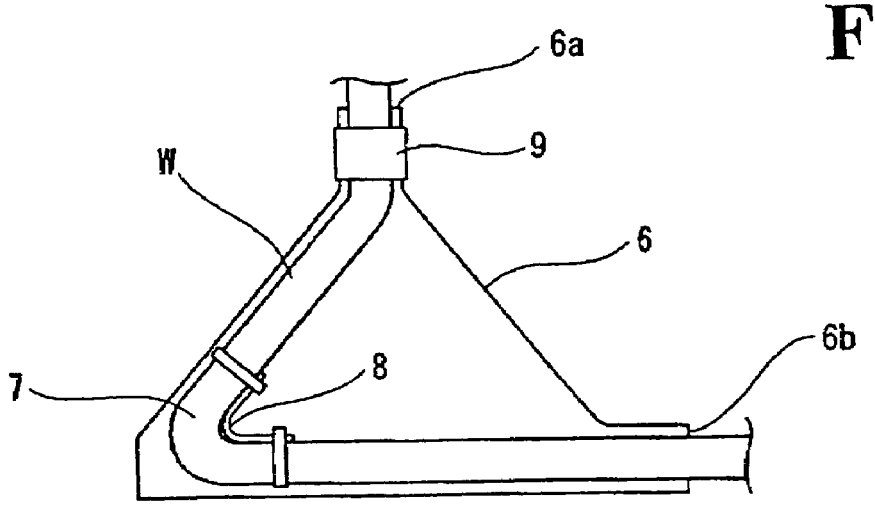
FIG. 2A is an example of a prior art structure for mounting a door harness.
Figure 2B:
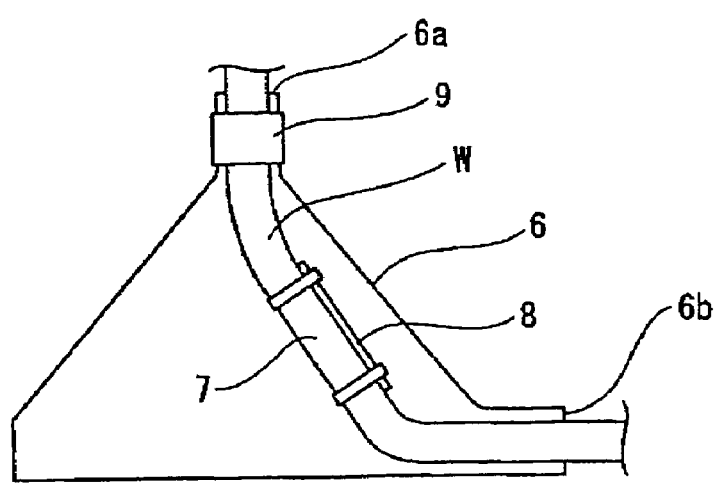
FIG. 2B is a second view of the prior art structure for mounting a door harness according to FIG. 2A.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

FIGS. 3 to 11 show a system 10 for mounting a door harness 20. The door inner panel 11 has an internal face 11a facing the passenger compartment and a edge or side face 11b facing the body panel 16 of a vehicle. A weather strip 18 is mounted so as to extend along a mounting line on edge face 11b. In the present invention, the door harness 20 is wired from the internal face 11a of the door inner panel 11 to the body panel 16, along a path line that is closer to the compartment than is the mount line of the weather strip. In other words, between the weather strip 18 and the door harness 20, the door harness is the innermost.

Figure 4:
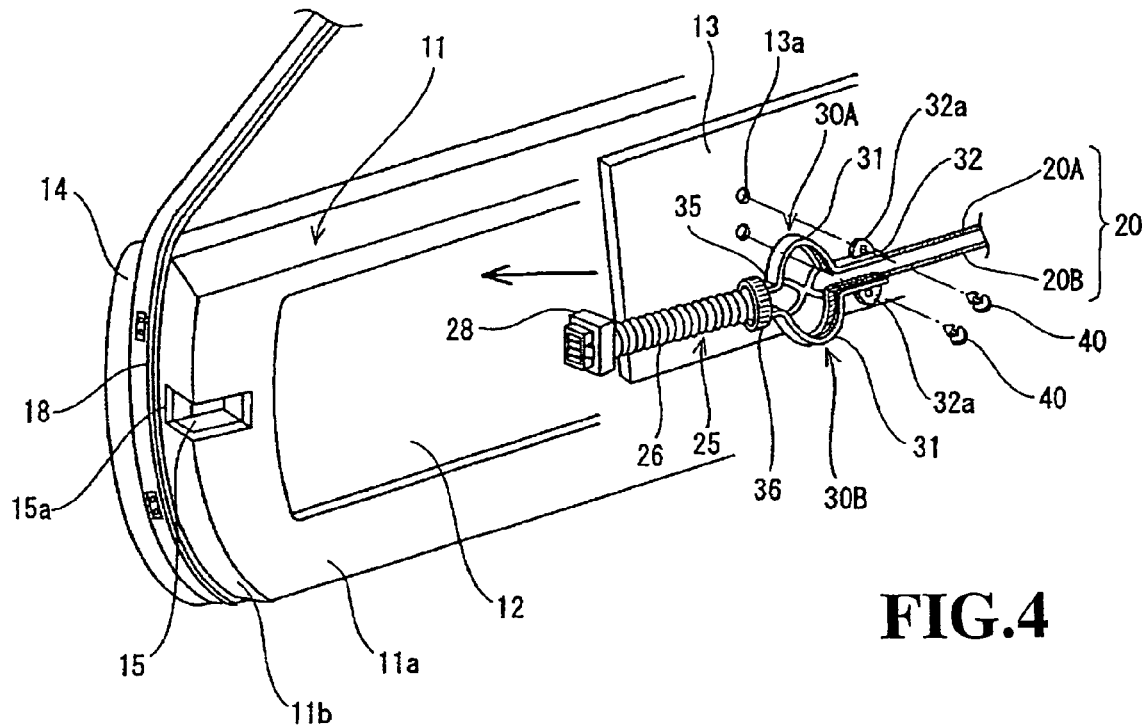
FIG. 4 is a partially exploded perspective view of the embodiment shown in FIG. 3.

As shown in FIG. 4, the internal face 11a of the door inner panel 11 is provided with a fitting portion, for example, a recessed portion 12. A mounting panel 13, which may be formed of any suitable material such as, for example, resin, engages with the recessed portion 12 and serves as a fitting frame. The corner portion formed by the internal face 11a and the edge face 11b is provided with a grooved, recessed, or indented portion 15. A weather strip 18 is mounted along a mount line on the edge face 11b of the door inner panel 11. The grooved portion 15 has a half open base 15a that extends from the edge face of the door inner panel 11, parallel to the internal face thereof. This half open base 15a is positioned at the side of the passenger compartment, seen from the mount line of the weather strip 18. The door inner panel 11 is flanked from the outside of the vehicle by a metal door outer panel 14.

Figure 3:
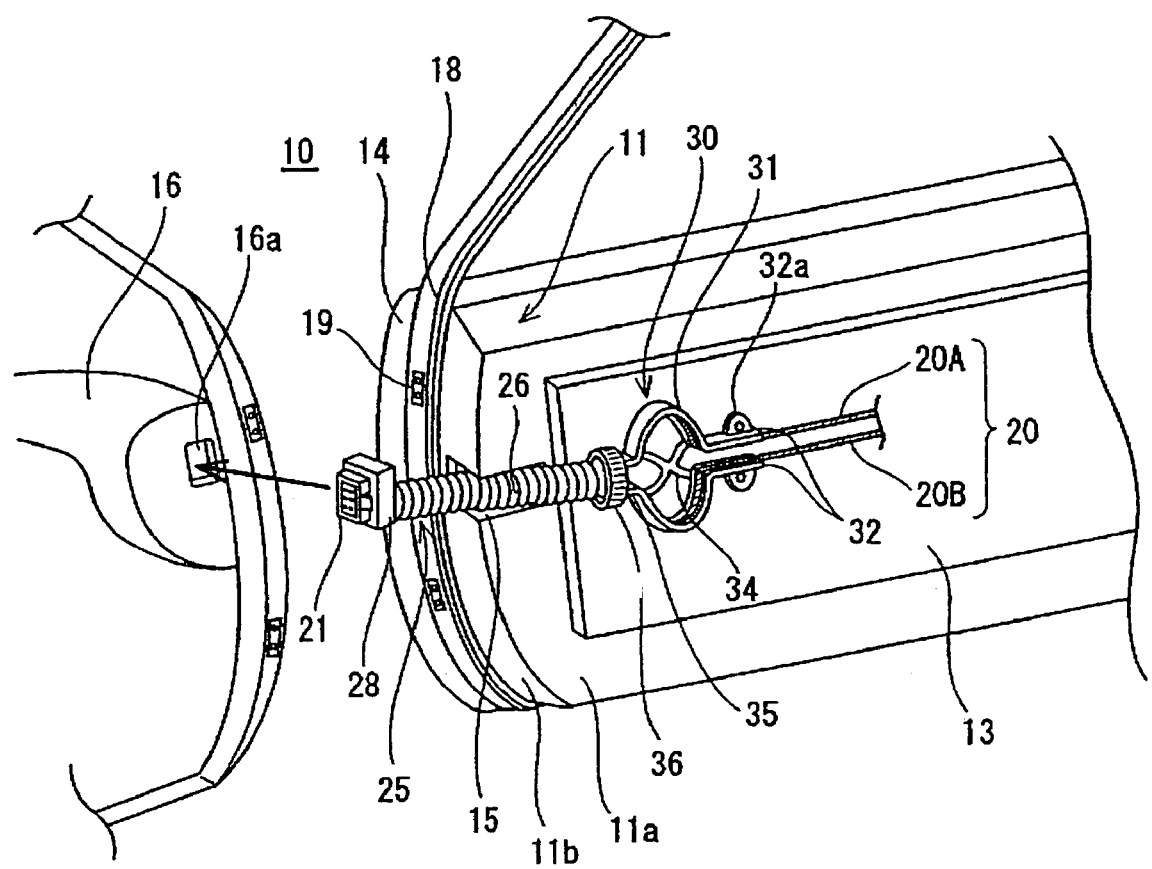
FIG. 3 is a perspective view of a door harness mounting device according to a first embodiment of the present invention.
Figure 6:
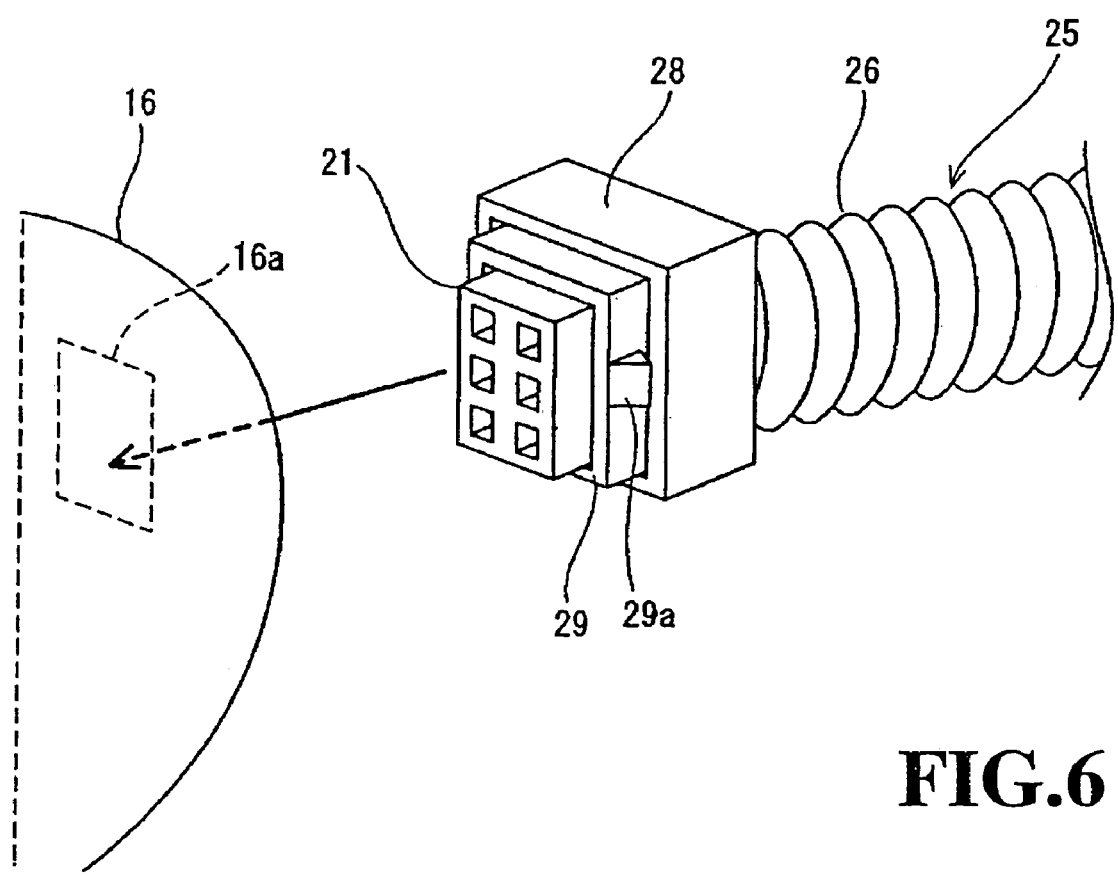
FIG. 6 illustrates the manner in which the connector of the door harness of the embodiment of FIG. 3 is connected to the body panel of a vehicle.
Figure 7A:
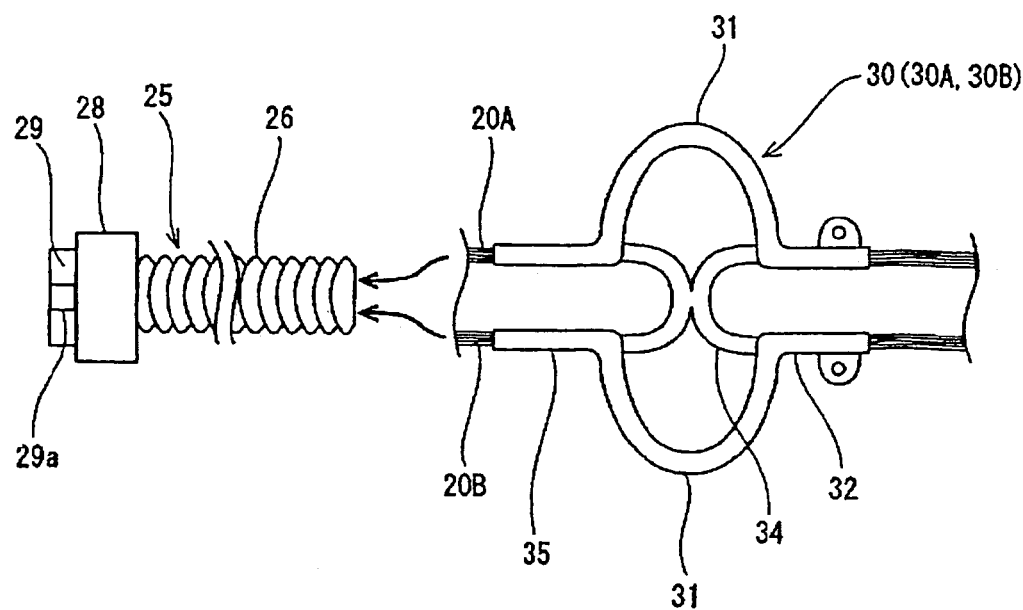
FIG. 7A illustrates the manner in which the door harness is fitted with the grommet and the expandable and compressible guide members in the embodiment of FIG. 3.
Figure 7B:
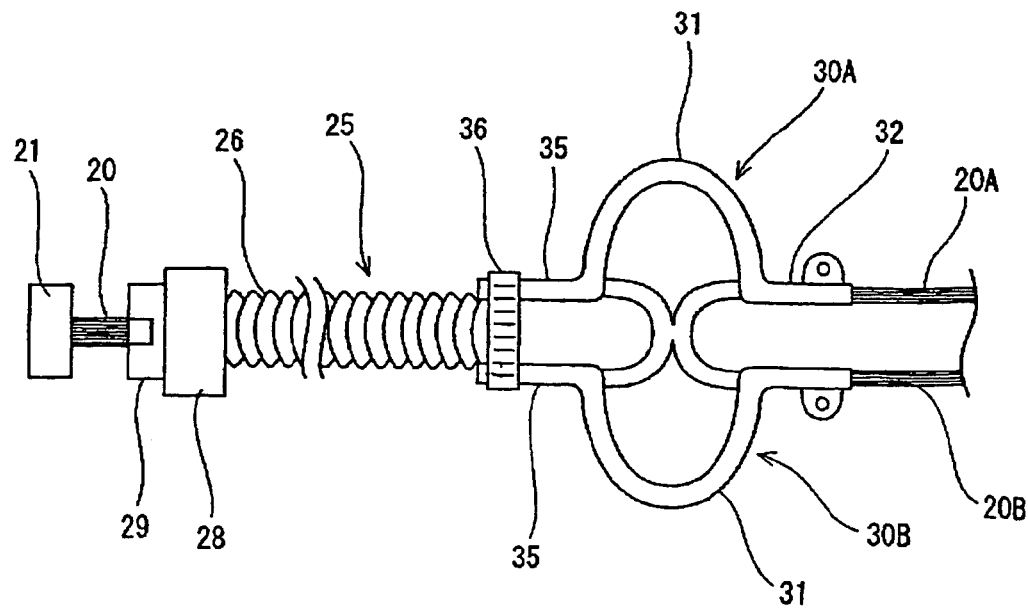
FIG. 7B illustrates the manner in which the door harness is fitted with the grommet and the expandable and compressible guide members in the embodiment of FIG. 3.

As shown in FIG. 3, the end portion of the door harness 20 is fitted with a grommet or duct or sheath 25 that includes a bellows portion 26 that may be in any suitable form such as, for example, a cylindrical form. As shown in FIGS. 7A and 7B, a first end portion of the grommet 25 is provided with a connector housing 28 containing a connector 21 (FIG. 7B), and a second end portion of the grommet is provided with a elastic device such as, for example, a pair of expandable and compressible guide members 30. The grommet 25 and the elastic device are attached by a fixing device such as, for example, a tie band 36. The grommet 25 may be formed of any suitable material, and typically is formed of rubber or an elastomer. As shown in FIG. 6, the connector housing 28 retains within its internal structure part of an inner frame 29. The inner frame may be formed of resin. The projecting portion of the inner frame 29 is provided with a device to engage the vehicle body, such as, for example, a pair of projections 29a.

Figure 8A:
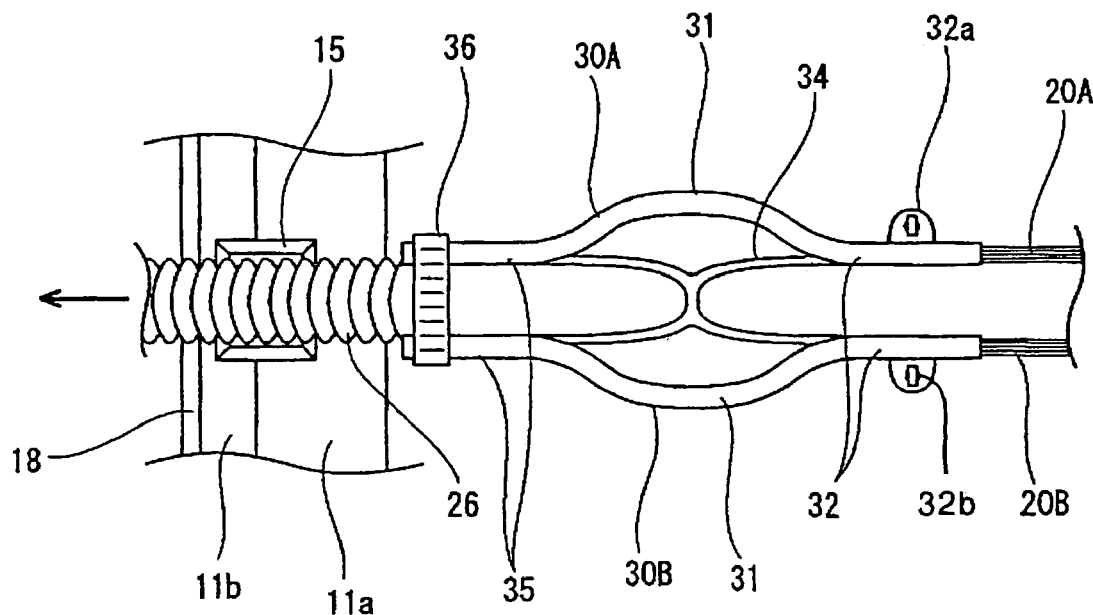
FIG. 8A illustrates the grommet and the expandable and compressible guide members of the embodiment of FIG. 3 when the door is open.
Figure 8B:
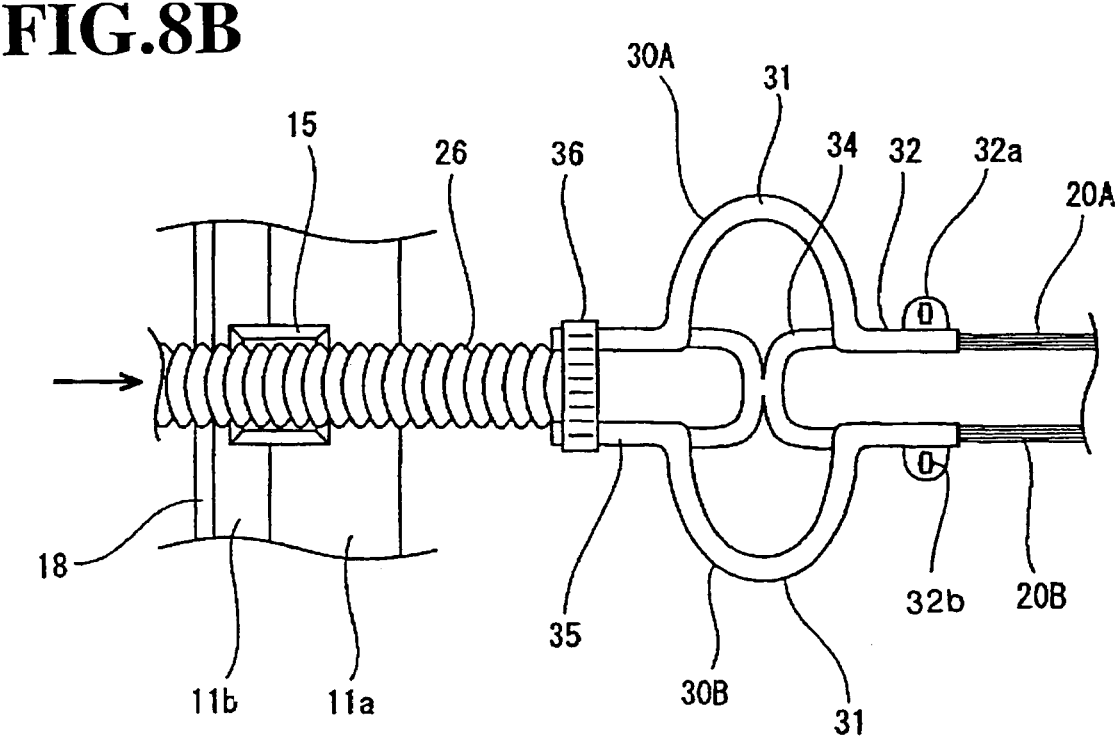
FIG. 8B illustrates the grommet and the expandable and compressible guide members of the embodiment of FIG. 3 when the door is closed.

The pair 30 of expandable and compressible guide members 30A, 30B may be formed of any suitable material such as, for example, a resin. Each guide member 30A, 30B includes, at its central zone, elastic portions. The elastic portions may be spring portions 31, in the form of a semicircular arch. A grommet fixing portion 35 having a substantially flat shape extends from a first end of the elastic portions 31, and a panel fixing portion 32 having a substantially flat shape extends from a second end of the elastic portions 31. The panel fixing portion 32 is further provided with a clipping portion 32a with a clip hole 32b (FIGS. 8A, 8B).

Figure 5:
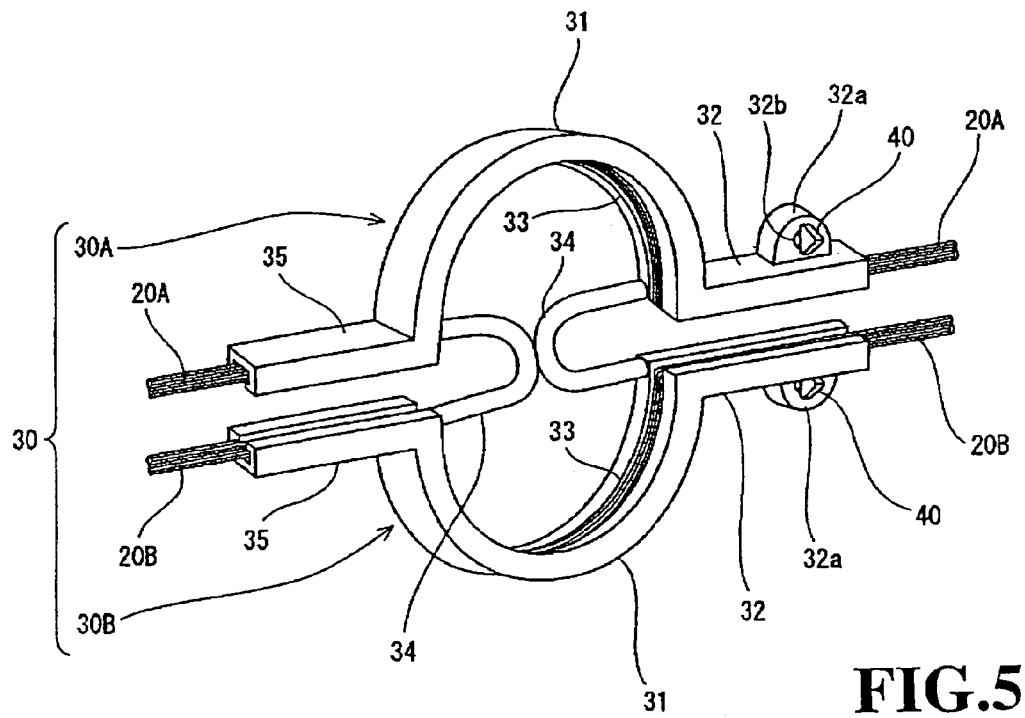
FIG. 5 is an enlarged perspective view of the expandable and compressible guide members of the embodiment shown in FIG. 3.

As shown in FIG. 5, the expandable and compressible guide members 30A, 30B each include grooves 33 at their confronting internal faces and extending therealong. The grooves 33 define a C-shaped or U-shaped cross-section along the inside of which the door harness 20 is fitted. Further, both ends of each of the elastic portions 31 are interconnected by a link member 34, for example, substantially in the form of an X. Particularly, the link member 34 connects the confronting ends of the respective guide members 30A, 30B, for each of their ends, thereby forming top to bottom links, and the respective ends of each of the guide members, thereby forming longitudinal links or left to right links as shown in the figure.

The door harness 20 is separated into two portions 20A and 20B, which are respectively held by the corresponding groove 33. As shown in FIG. 7A, the two portions of door harness 20A and 20B are assembled into one section and led into the grommet 25.

In this state, the grommet fixing members 35 of the expandable and compressible guide members 30A, 30B are superposed on the second ends of the bellows portion 26 (e.g. in a cylindrical form) of the grommet 25, and fixed by the tie band 36.

In the door harness 20 equipped with the grommet 25 and the expandable and compressible guide members 30A, 30B shown in FIGS. 3 and 4, the grommet 25 is passed through the grooved portion 15 in the door inner panel 11 (FIG. 3), and pulled toward the body panel 16. The resin projections 29a of the inner frame 29 are then inserted into the hole 16a of the body panel 16 and held therein, and the connector 21 at the first end of the grommet 25 is connected to another harness provided at the body side of the car. The door harness 20 and the second end of the pair of expandable and compressible guide members 30 are fixed to the compartment side of the mounting panel 13 by fitting a clip 40 through the clip hole 32b in the panel-fixing portion 32, into the mounting hole 13a in the mounting panel 13. The mounting panel 13 is then engaged with the door inner panel 11 through the fixing device 12 thereof. The compartment side of the resin panel 13 is mounted with a trimming device, so as to cover the exposed portion of the door harness 20.

According to the structure 10 of the embodiment of the door harness 20 installation device shown in FIG. 3, the wiring path of the door harness 20 is located closer to the compartment side than is the weather strip 18. Likewise, the door harness 20 is located closer to the compartment side than is the hinge arrangement 19 binding the door inner panel 11 to the body panel 16. Accordingly, when the door is opened or closed, the door harness is twisted or stretched or compressed. However, the elastic portions 31 of the expandable and compressible guide members 30 are stretched together with the door harness 20, when the door is opened (see FIG. 8A), whereas the elastic portions 31 are compressed and restored with the help of the link member 34, when the door is closed (see FIG. 8B). Accordingly, the length of the door harness 20 exiting from the grooved portion 15 can be adjusted. As a result, the door harness 20 and the grommet 25 placed near the hinge arrangement 19 can follow smoothly the movement of the door, and the opening and shutting operations are facilitated. Further, since the door harness 20 is placed closer to the inside compartment than the weather strip 18 is, it is not necessary to flatten the door harness 20 and the grommet 25, or to specifically a provide water-sealing device in order to secure high water sealability.

The present invention is not limited to the embodiment disclosed above. For example, the X-shaped linking member in the expandable and compressible guide members 30 may be eliminated in an alternative embodiment. Additionally, the elastic portions in the form of a semicircular arch may be replaced by one or several curved flat plates in another alternative embodiment. In this alternative embodiment, each of door harness halves 20A and 20B may be arranged along the flat plates and held by a suitable member such as, for example, tape. Further, the expandable and compressible guide members may be fixed to the grommet, instead of to the tie band, by any suitable linking member that does not deflect from the grommet when the guide member is stretched or compressed.

Figure 9:
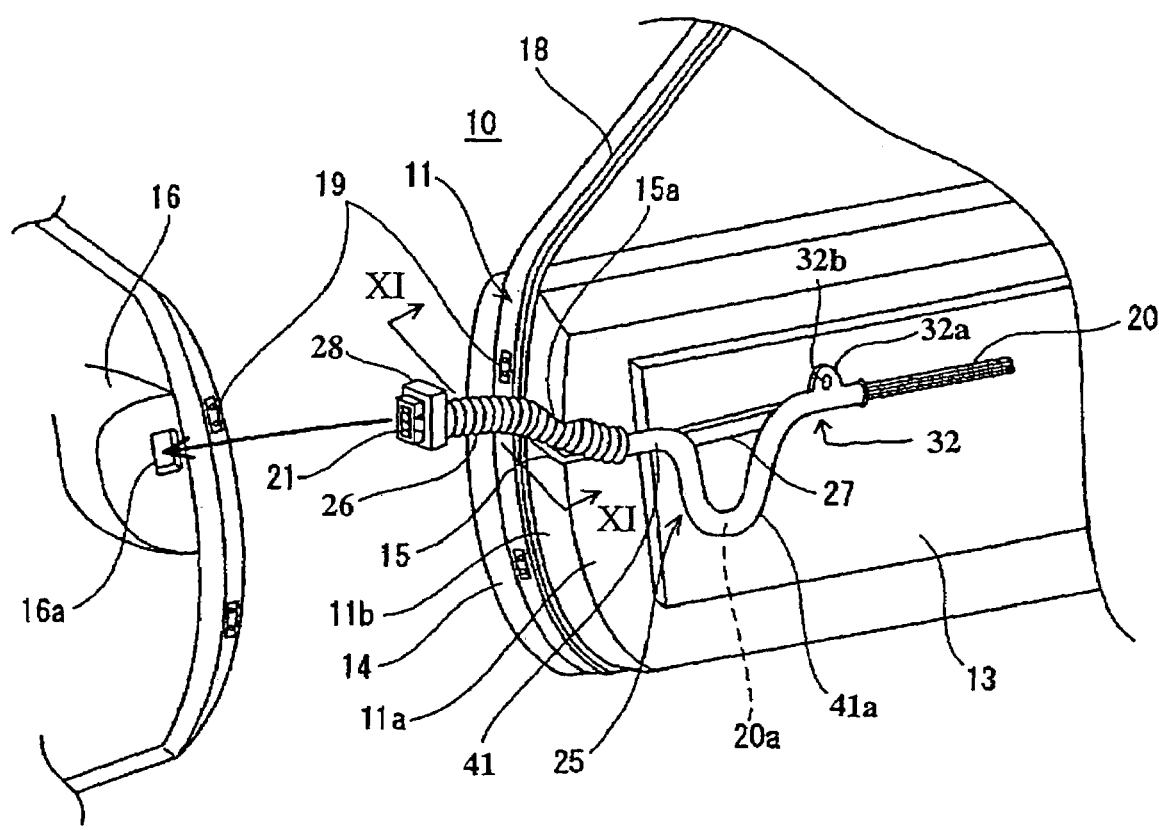
FIG. 9 is a perspective view of a door harness mounting device according to a second embodiment of the present invention.

In a second embodiment of the invention, shown in FIG. 9, the end portion of the door harness 20 is fitted with a grommet 25 and connected to a connector. The grommet 25 may be formed of any suitable material and in the present embodiment is formed of rubber or an elastomer and includes an integrated an elastic portion as in the first embodiment. The elastic portion includes, from the door side to the vehicle's body side, a comparatively long looped section 41 having a cylindrical shape through which the door harness is passed, a comparatively short spring member 27 which binds both ends of the looped section 41 by forming a straight-line path between the ends, so maintaining the loop configuration, a bellows portion 26 having, for example, a cylindrical shape, and a connector housing 28. The looping portion 41a defined by the spring member 27 is passed through by the excess length portion 20a of the door harness such that the door harness 20 can expand or contract.

The spring member 27 is in the form of a band having a rectangular cross-section, and is highly expandable and compressible. Further, as shown in FIG. 6, an inner frame 29 formed, for example, of resin is provided so as to project partly from the connector housing 28. This projecting portion includes, for example, a pair of projections 29a with which the body panel is engaged.

Further, the end portion of the looped section 41 that is distal from the connector housing 28, where the spring member 27 is engaged, includes a panel fixing portion 32 with a clip-fastening hole 32b. The fixing portion 32 and clip fastening hole 32b may be formed integrally and in one piece with the looped section 41. The mounting panel 13 is also provided with mounting hole 13a (FIG. 10).

As shown in FIG. 9, the door harness 20 mounted with the grommet 25 is passed on the internal face 11a of the door inner panel 11 and pulled out toward the body panel 16, such that the bellows portion 26 of the grommet 25 is provided in the grooved portion 15.

As shown in FIG. 6, the connector 21 of the pulled-out door harness 20 is then connected to a harness in the body panel 16 through a hole 16a formed therein, such that the projections 29a of the inner frame 29 mounted with the grommet 25 are engaged with the hole 16a. The end portion of the grommet 25 distal from the connector housing 28, together with the door harness 20, are bound to the surface of the mounting panel 13 facing the compartment of the vehicle, by inserting a clip 40 into the mounting hole 13a of the mounting panel 13 and the clip-fastening hole 32b in the panel-fixing portion 32 of the grommet 25 (FIGS. 9 and 10). The mounting panel 13 is then fitted into the recessed portion 12 in the door inner panel 11. The exposed portion of the door harness 20 is covered with a trim.

Figure 10:
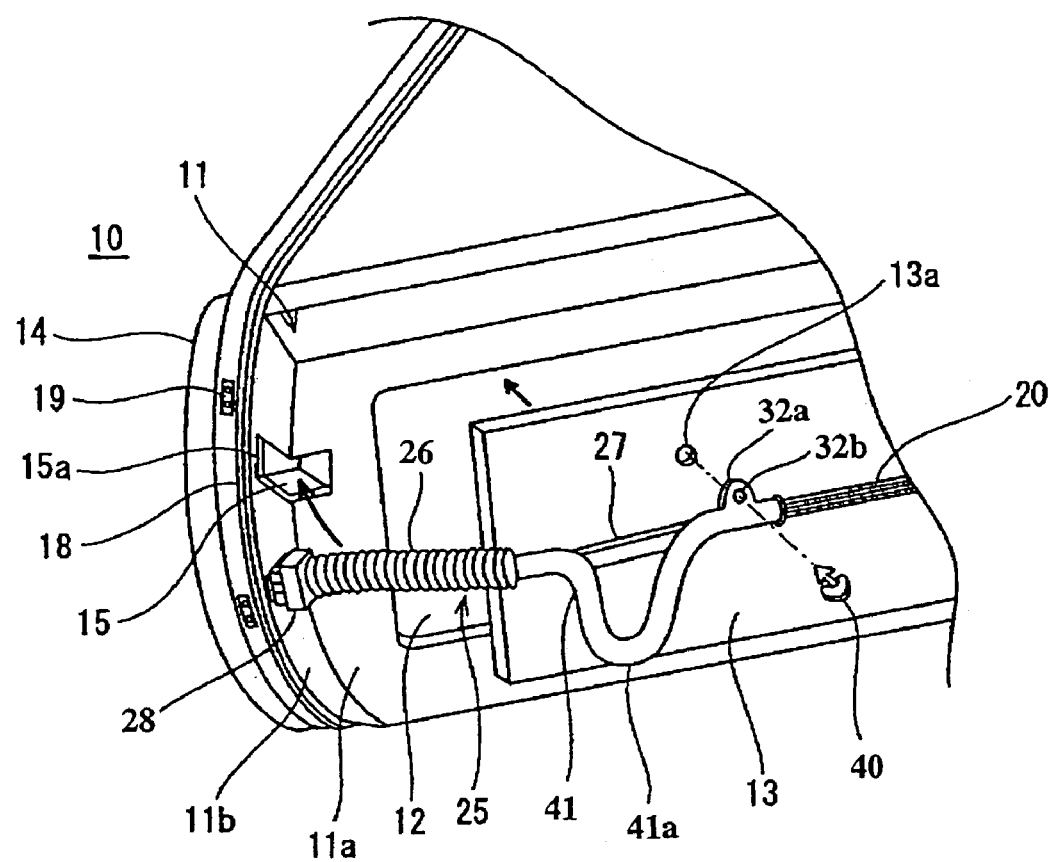
FIG. 10 is a partially exploded perspective view of the door harness mounting device of the embodiment of FIG. 9.
Figure 11:
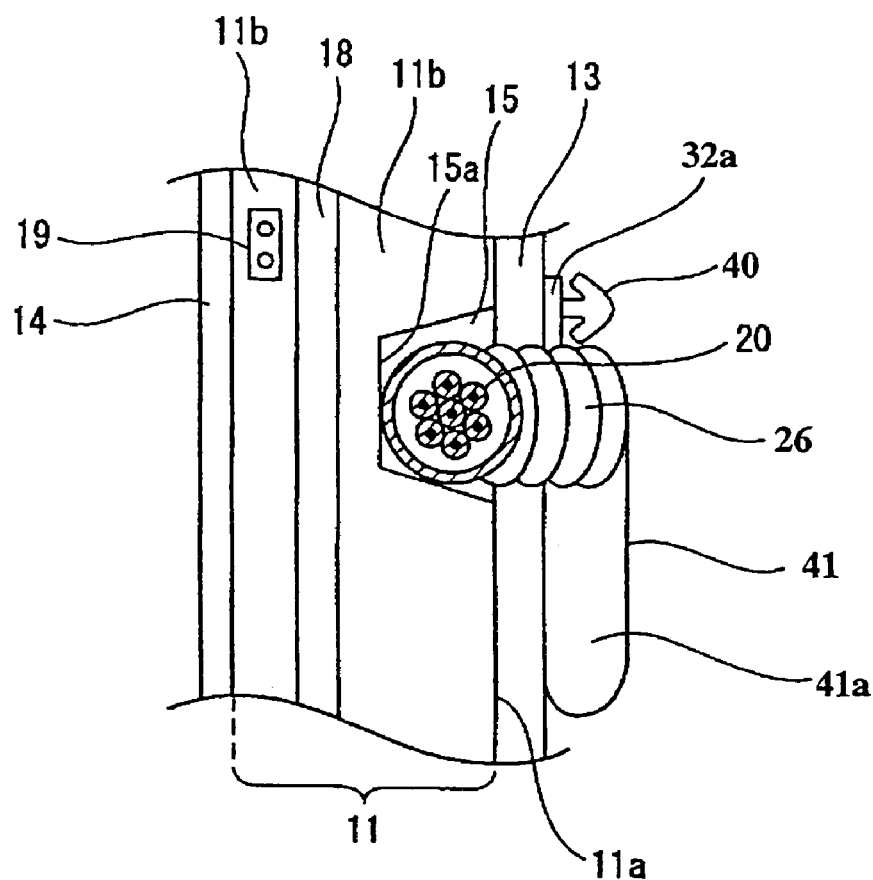
FIG. 11 is cross-sectional view taken along line IV—IV of FIG. 9.
Figure 12A:
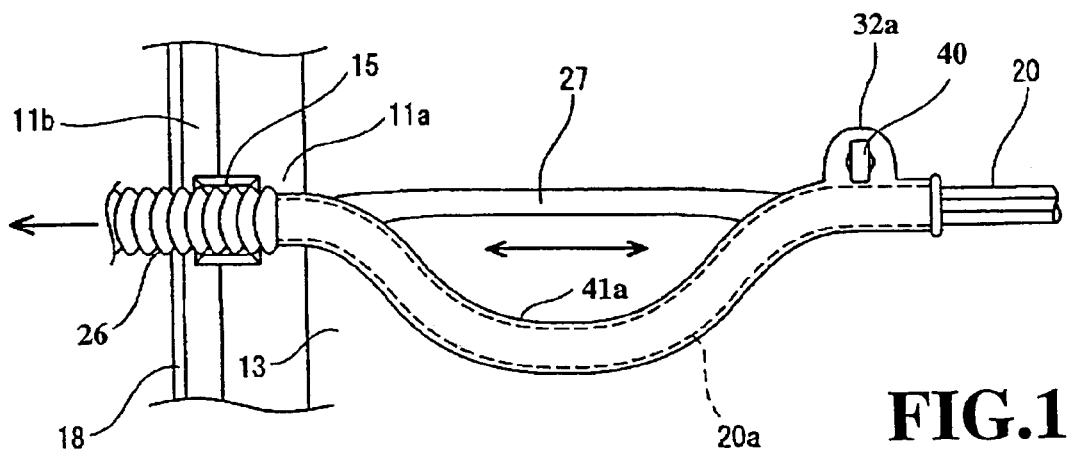
FIG. 12A illustrates the grommet and the door harness of the embodiment of FIG. 9 when the door is open.
Figure 12B:
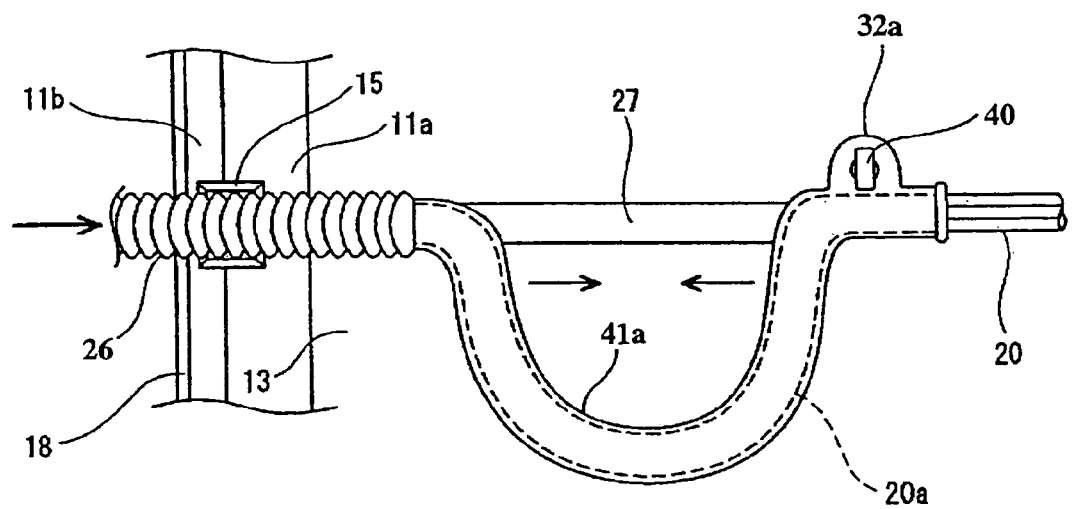
FIG. 12B illustrates the grommet and the door harness of the embodiment of FIG. 9 when the door is closed.

According to the structure 10 of the invention for installing the door harness 20 shown in FIGS. 9 and 10, the wiring path of the door harness 20 is located, compared to weather strip 18, closer to the passenger compartment. Likewise, the door harness 20 is located more closely to the compartment, compared to the hinge arrangement 19 binding the door inner panel 11 to the body panel 16. Accordingly, when the door is opened or closed, the door harness is twisted, stretched or compressed. However, the spring portion 27 of the grommet 25 is stretched together with the door harness 20, when the door is opened (see FIG. 12A), and conversely the spring portion 27 is shrunk and restored, when the door is closed (see FIG. 12B). In this way, the length of the door harness 20 exiting from the grooved portion 15 can be regulated. As a result, the door harness 20 and the grommet 25 placed near the hinge arrangement 19 can follow smoothly the movement of the door, and the opening and shutting operations are improved. Further, since the door harness 20 is placed closer to the inside compartment than the weather strip 18, it is not necessary to flatten the door harness 20 and the grommet 25, or to specifically provide a water sealing member in order to secure high water sealability.

The present invention is not limited to the embodiments disclosed above. For instance, the spring portion may be a member other than the band having a rectangular cross-section. As far as the spring portion is expandable and contractable, the spring portion may be formed in any suitable manner such as, for example, as a tube or a round cable. The grommet, duct, or sheath 25 may be formed of any suitable material such as, for example, an elastomer. Further, the panel-fixing portion 32 of the grommet 25 may be configured so that it can be fixed to the internal base of the recessed portion 12 of the door inner panel 11.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Applications Nos. 2003-419113 and 2003-419473, both filed on Dec. 17, 2003, which are both herein expressly incorporated by reference in their entireties.

What is claimed is:

1. A door harness mounting device to mount a door harness within a door inner panel of a vehicle, the door inner panel including an internal face facing the compartment of the vehicle, a mounting panel mountable on the internal face, an edge face facing a body panel of the vehicle and a weather strip extending on the edge face, said door harness mounting device comprising:

a grommet having a bellows portion and an elastic member, said elastic member including an elastic portion and a panel fixing portion, said grommet configured such that the door harness may be fitted into said grommet and mounted closer to the internal face than the weather strip;

said panel fixing portion configured to engage the mounting panel, wherein said elastic member may be mounted on the mounting panel; and the mounting panel is configured to engage the internal face, wherein said elastic portion may expand or contract with opening and closing of the doors, wherein said elastic portion comprises a looped section having a bellows side end and a spring member, said looped section longer than said spring member, said looped section being formed by binding said bellows side end and said panel fixing portion with said spring member, and wherein said spring portion stretches together with the door harness when the door is opened, and contracts and is restored to its original state together with the door harness when the door is closed.

2. The door harness mounting device according to claim 1, wherein the internal face and the edge face form a corner portion, the corner portion comprising a grooved portion positioned closer to the compartment than the weather strip, whereby the door harness can extend on the internal face of the door inner panel and through the grooved portion, and be pulled out toward a body panel.

3. The door harness mounting device according to claim 1, wherein the internal face of the door inner panel comprises a recessed portion, the recessed portion configured to engage the mounting panel.

4. The door harness mounting device according to claim 1, wherein said grommet is formed integrally and in one piece of rubber or an elastomer.

5. The door harness mounting device according to claim 1, wherein said bellows portion is cylindrical.

6. The door harness mounting device according to claim 1, wherein the body panel comprises an opening, said bellows portion comprises a connector terminal proximal to the body panel and comprising a projection configured to engage the opening.

7. A door harness wiring system for a vehicle including a door harness in a door inner panel, the door inner panel comprising an internal face facing the compartment of the vehicle, a mounting panel mountable on the internal face, an edge face facing a body panel of the vehicle and a weather strip extending on the edge face, said door harness wiring system comprising:

a grommet having a bellows portion and an elastic member comprising an elastic portion and a panel fixing portion;

wherein the door harness is fitted into said grommet and positioned closer to the internal face than the weather strip, said panel fixing portion engaging the mounting panel wherein said elastic member is mounted on the mounting panel, the mounting panel engages the internal face, and said elastic portion expands or contracts with opening or closing of the door, wherein said elastic portion comprises a looped section having a bellows side end and a spring member, said looped section longer than said spring member, said looped section formed by binding said bellows side end and said panel fixing portion with said spring member, and wherein said spring portion stretches together with the door harness when the door is opened, and said spring portion contracts and is restored to its original state together with the door harness when the door is closed.

8. The door harness wiring system according to claim 7, wherein the internal face and the edge face form a corner portion, the corner portion comprises a grooved portion and the grooved portion is positioned closer to the compartment than the weather strip, wherein the door harness can extend on the internal face of the door inner panel and through the grooved portion, and be pulled out toward a body panel.

9. The door harness wiring system according to claim 7, wherein the internal face of the door inner panel comprises a recessed portion configured to engage the mounting panel.

\* \* \* \* \*